Jan. 19, 1971 R. M. RIGOT ET AL 3,555,649
ADAPTOR FOR PNEUMATICALLY OPERATED PULLING TOOL
Filed Oct. 7, 1968 12 Sheets-Sheet 6
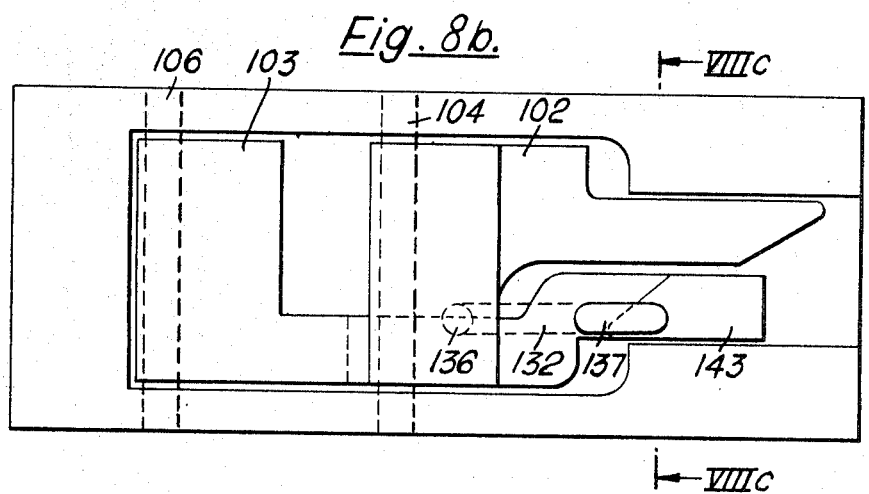
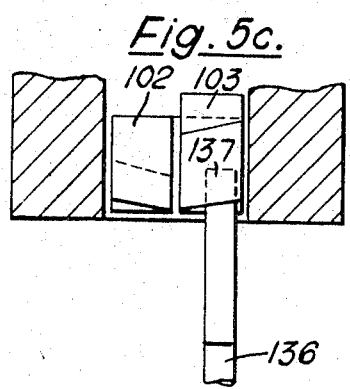
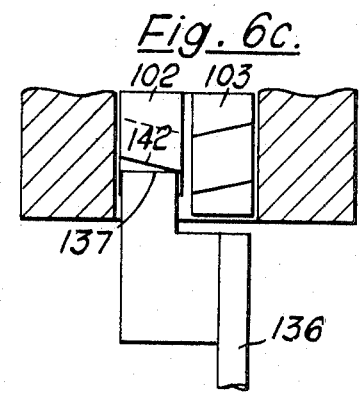
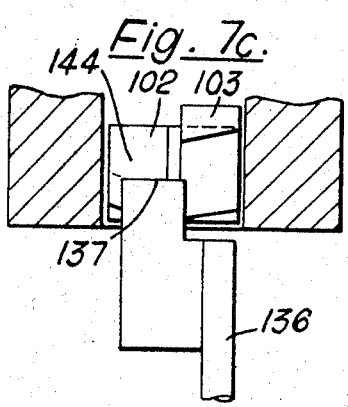
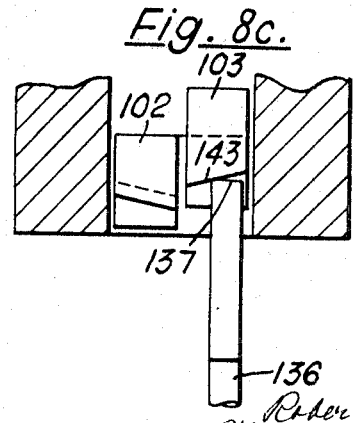

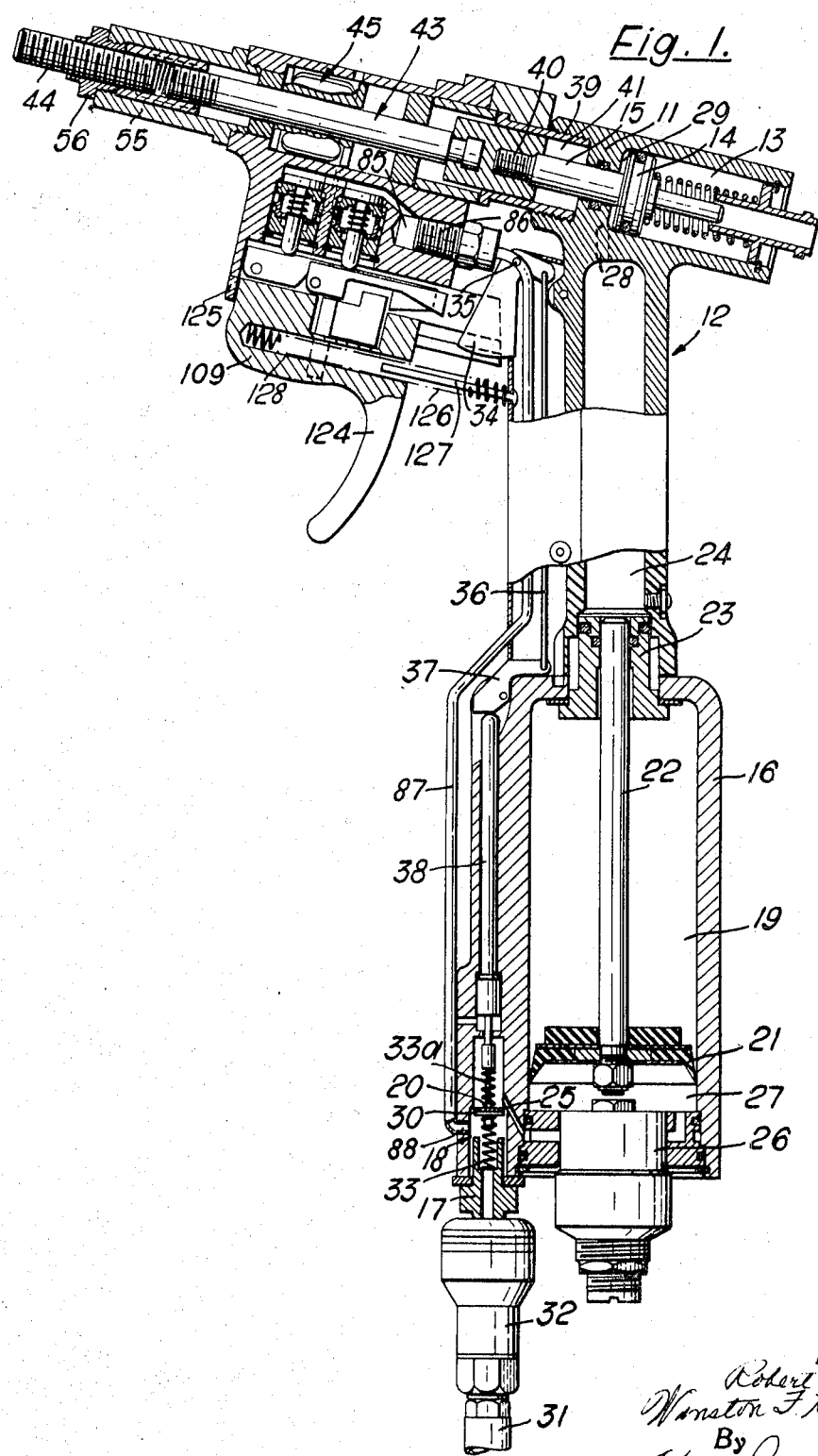

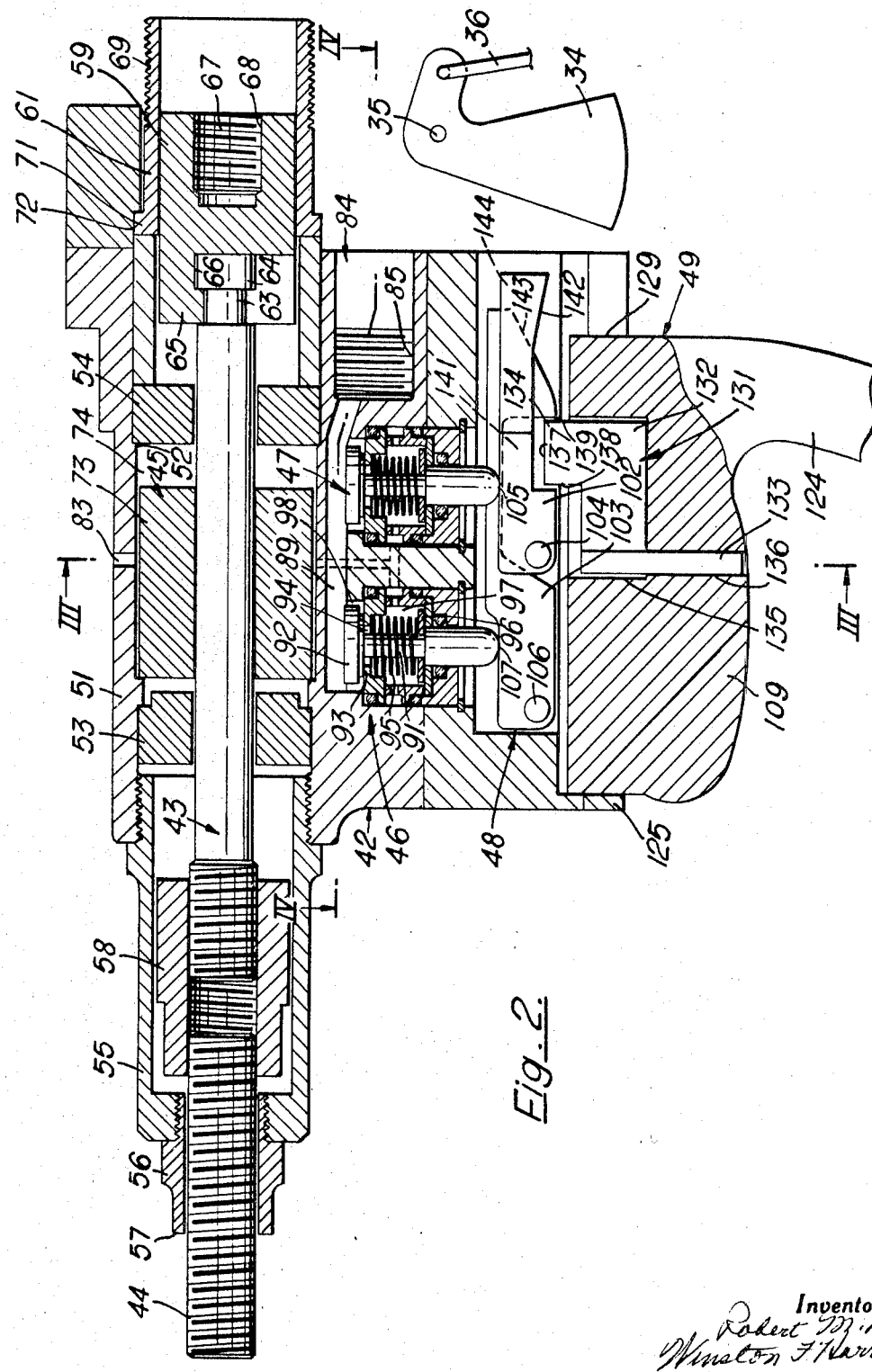

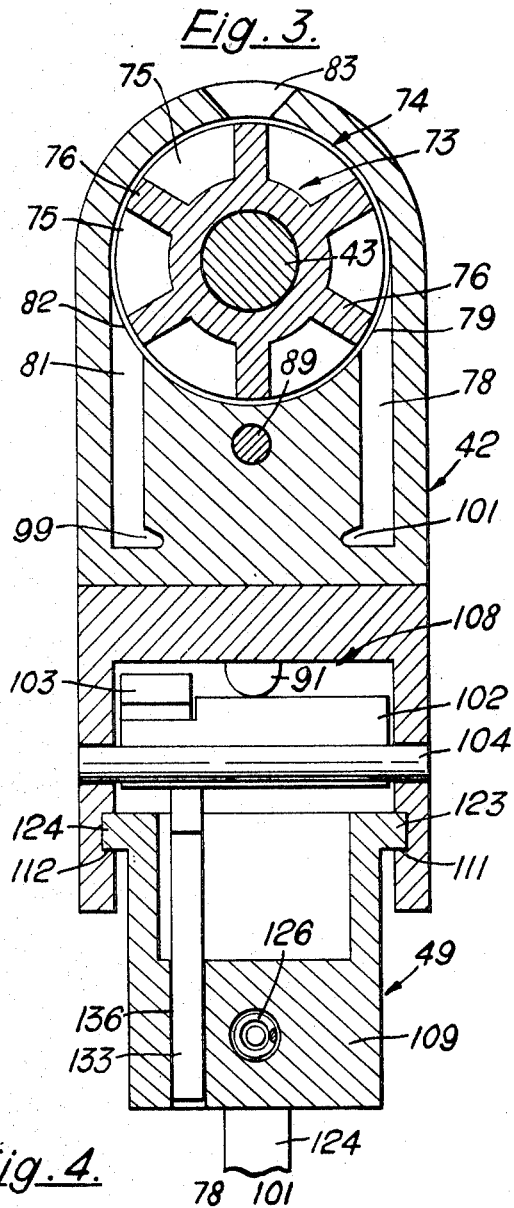
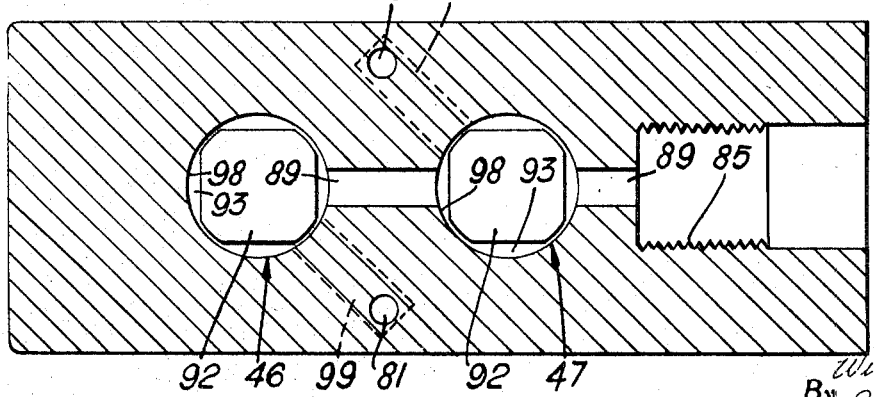

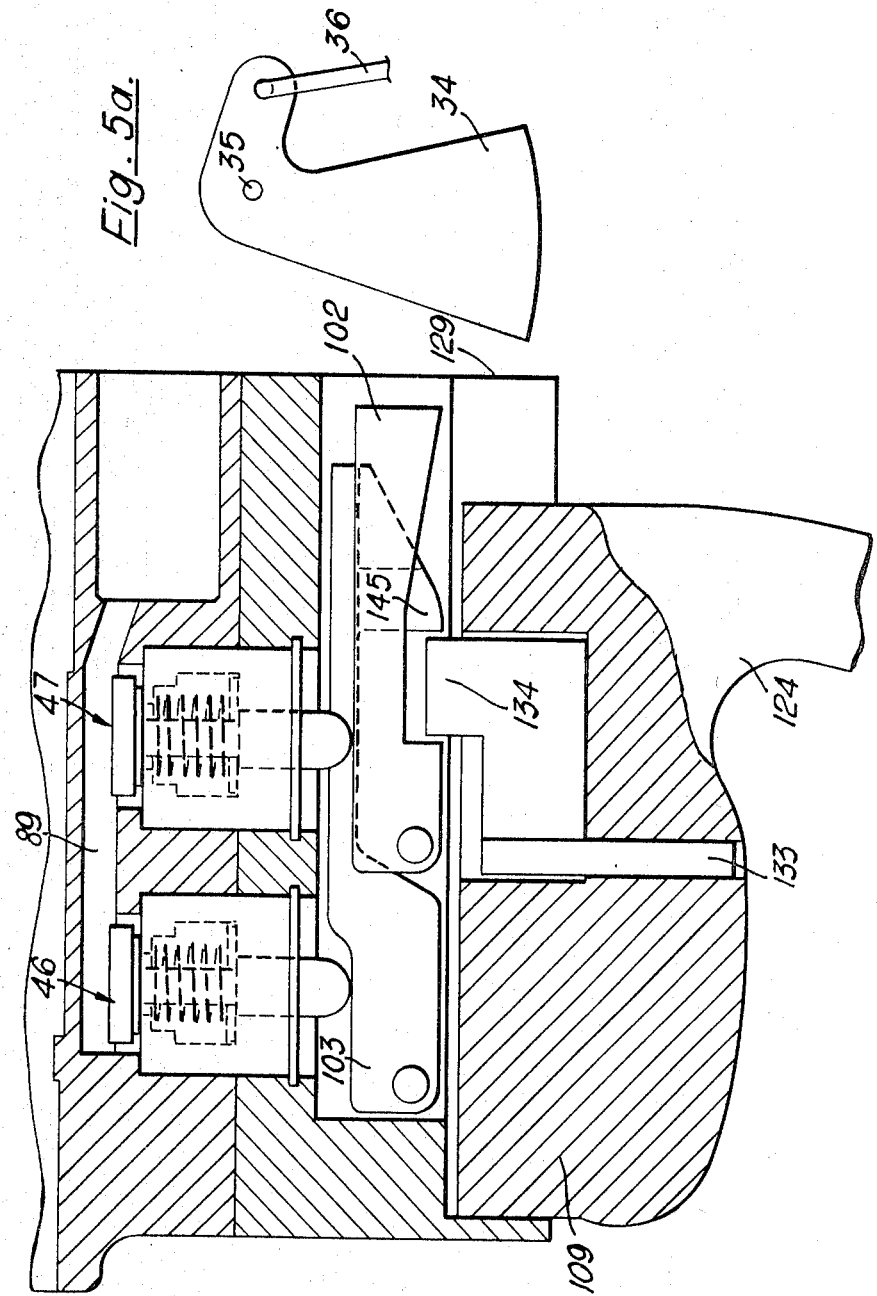

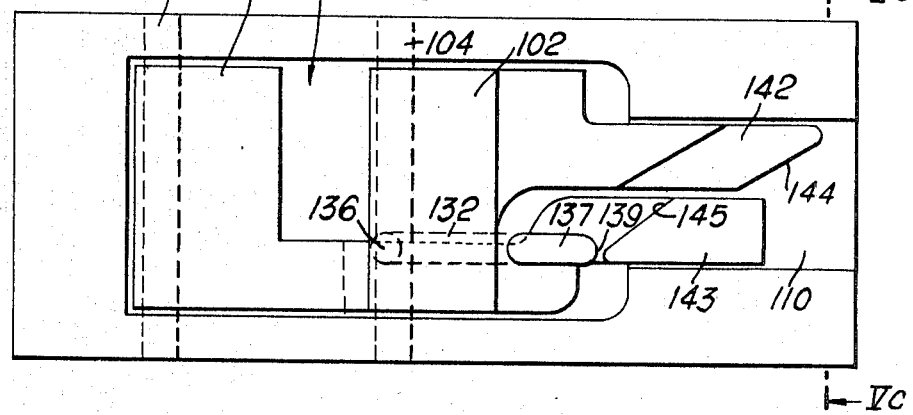
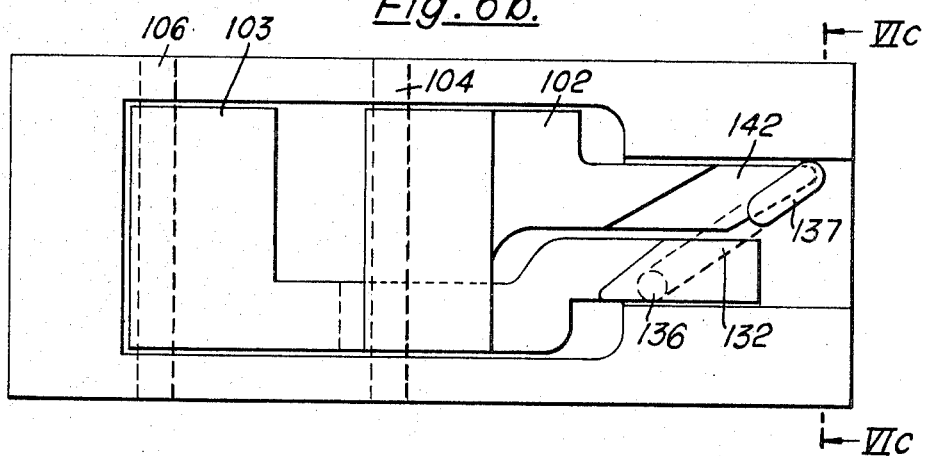
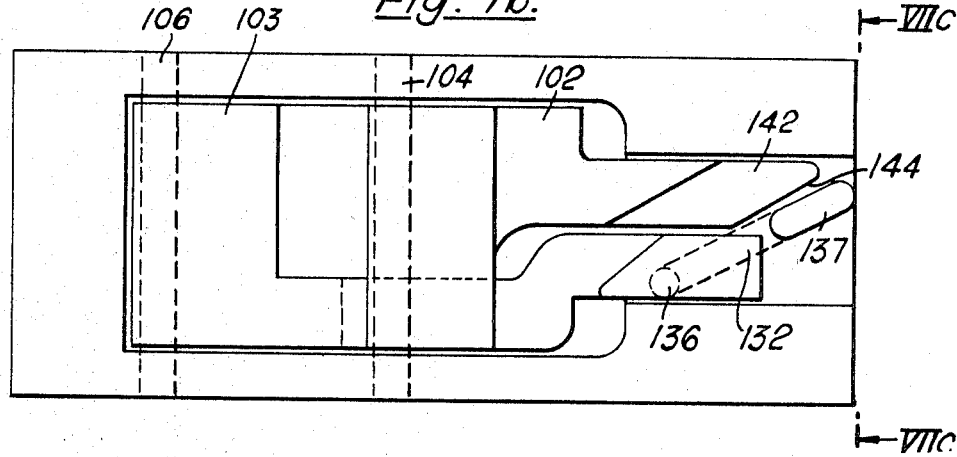

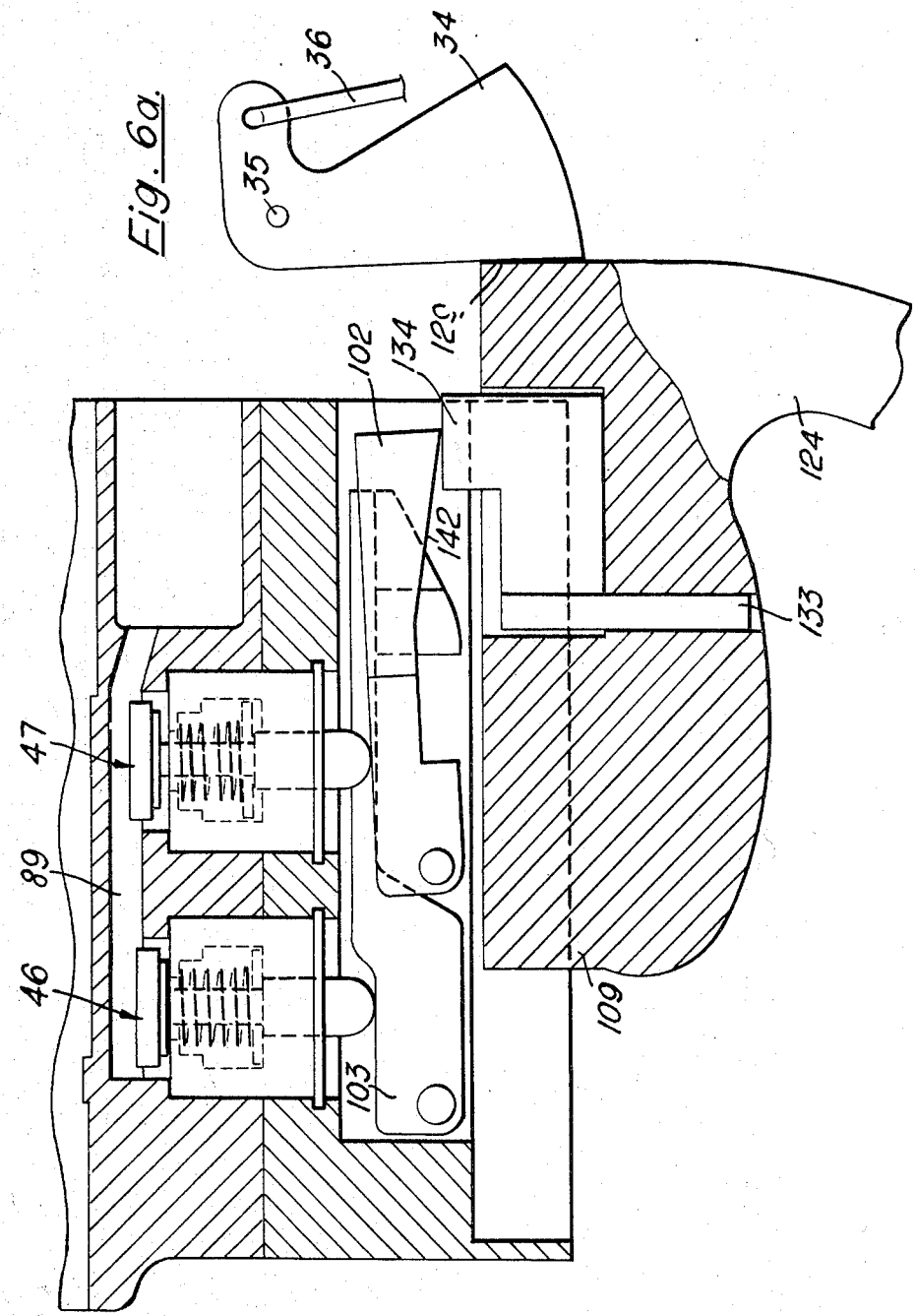

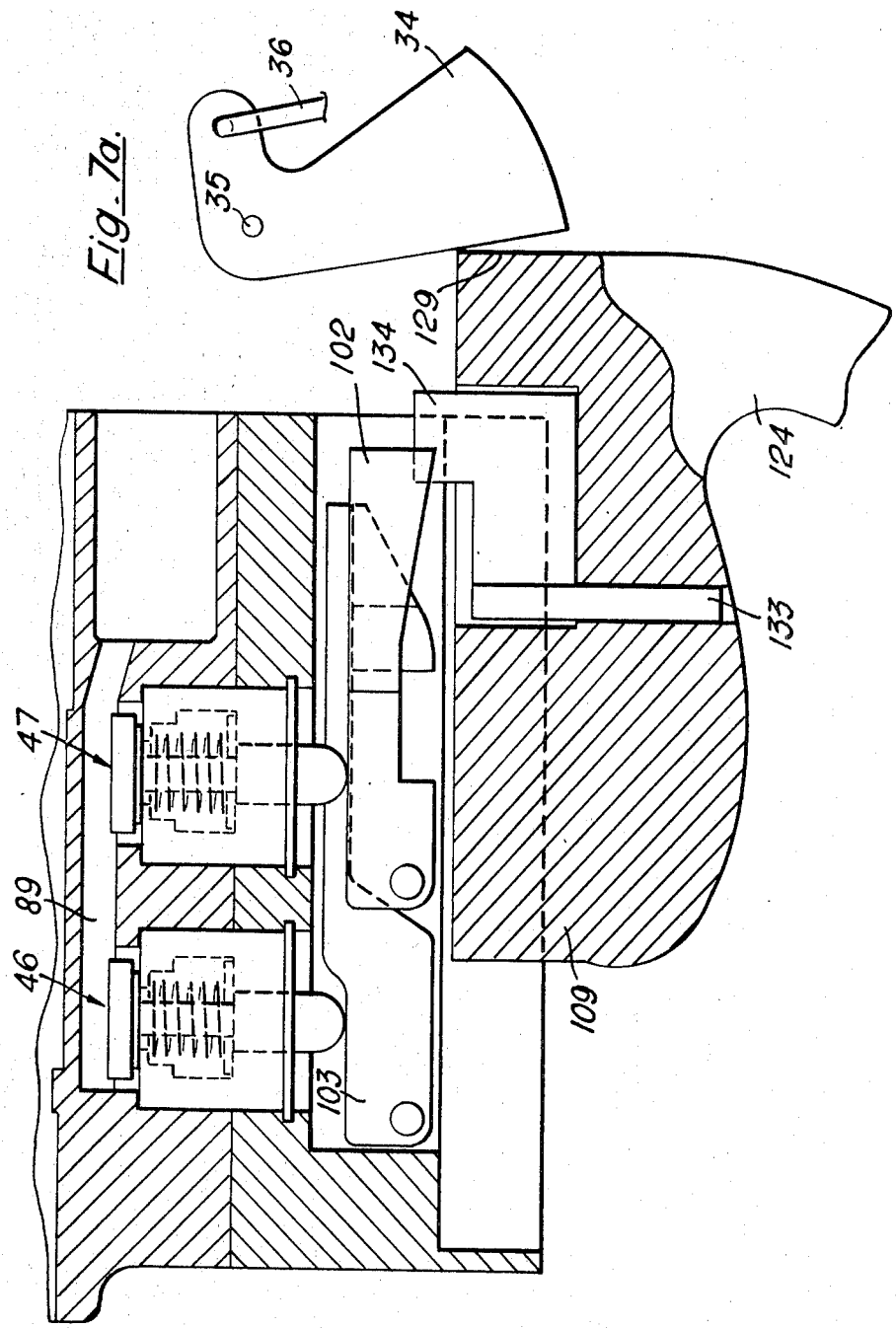

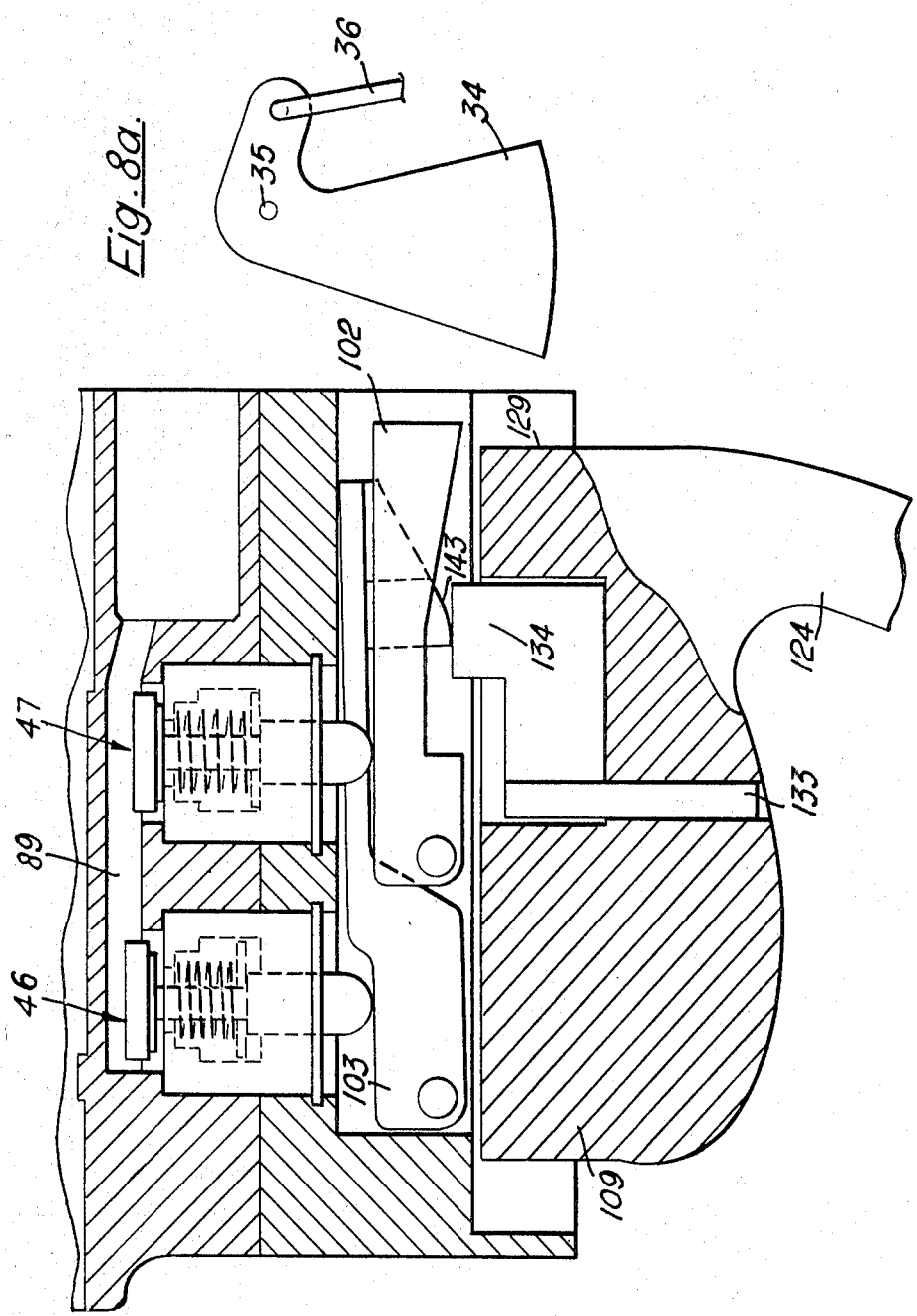

Jan. 19, 1971  R. M. RIGOT ET AL  3,555,649
ADAPTOR FOR PNEUMATICALLY OPERATED PULLING TOOL
Filed Oct. 7, 1968  12 Sheets-Sheet 11

Inventors
Robert M. Rigot
Winston F. Harrington
By
Kenyon, Palmer & Estabrook
Attorney

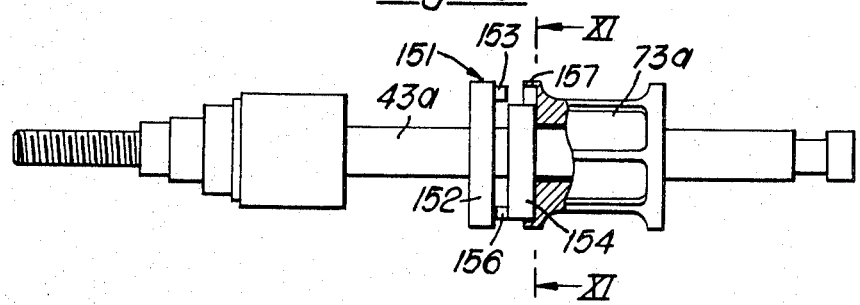
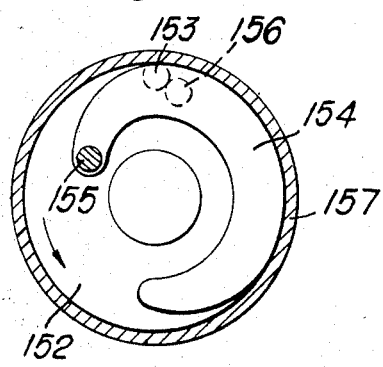
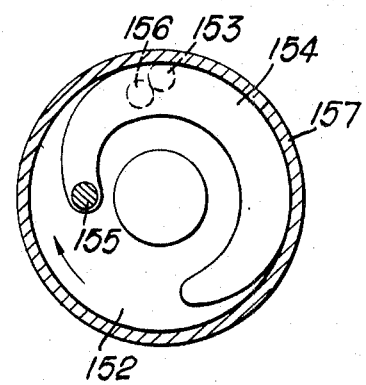

United States Patent Office 3,555,649
Patented Jan. 19, 1971

3,555,649
ADAPTOR FOR PNEUMATICALLY OPERATED PULLING TOOL
Robert M. Rigot, Granada Hills, and Winston F. Harrington, Tujunga, Calif., assignors to Aerpat A.G., Zug, Switzerland, a company of Switzerland
Filed Oct. 7, 1968, Ser. No. 765,539
Int. Cl. B23p *19/00, 19/04*
U.S. Cl. 29—200
10 Claims

ABSTRACT OF THE DISCLOSURE

The invention relates to an adaptor for converting a pneumatically operated pulling tool (e.g., of the type used for placing blind breakstem rivets) into a tool which can place internally threaded anchor socket fasteners which require a threaded pulling mandrel to be screwed into and unscrewed out of the fastener. The adaptor comprises a high-speed reversible air turbine mounted directly on the threaded mandrel shaft, valves controlling the turbine, and a single trigger mechanism, which automatically actuates both the turbine valves and the pulling trigger of the pull gun. When the adaptor trigger is pressed and released, the following actions recur in sequence: (1) the mandrel screws into the fastener; (2) the mandrel is pulled to place the fastener, and then released again; (3) the mandrel is unscrewed from the fastener.

---

Figure 9A:
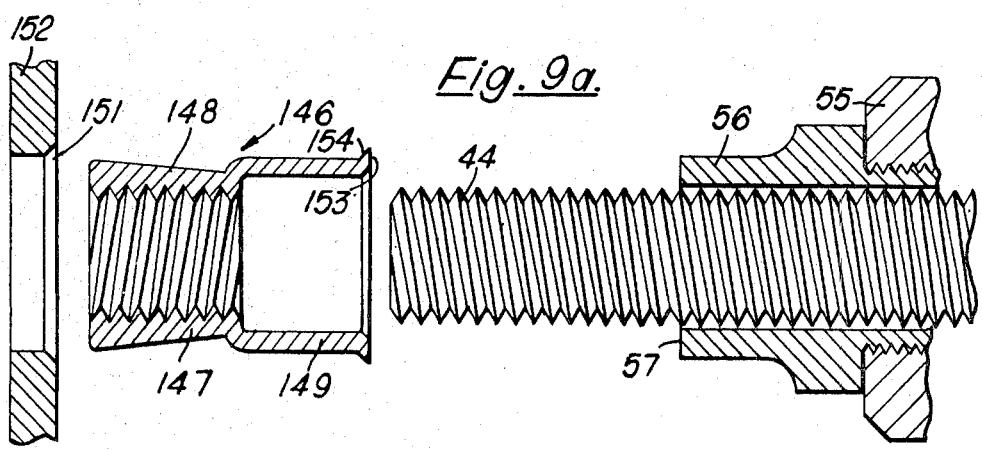

The invention relates to an adaptor for a pneumatically operated pulling tool of the type comprising: a head member, a pulling member, a pneumatically actuated power system for retracting the pulling member relative to the head member, and an actuating member operation of which actuates the said power system to retract the pulling member relative to the head member. Such a pneumatically operated hand tool is hereinafter referred to as a pneumatically operated hand tool of the type defined.

This definition includes a tool in which the pneumatically actuated power system comprises a hydro-pneumatic intensifier, that is, in which the pneumatic actuating power retracts the pulling member indirectly through the intermediary of a hydraulic thrust-increasing system.

Such pulling tools are commonly employed for the placing of fasteners such as blind rivets which require one part to be pulled with respect to another part. To this end the tool is usually fitted with jaws secured to the pulling member, which grip the part of the fastener to be pulled, and an anvil secured to the head member of the tool, which anvil contacts the said other part of the fastener to provide a reaction for the pull. Such fastener placing tools are well known to those skilled in the art of industrial fasteners.

Another type of fastener in common use is one in which an internally threaded nut portion is pulled into a tubular body portion to expand the latter in an aperture in a workpiece thereby to provide a threaded anchor socket into the workpiece. The placing of such a threaded fastener requires a threaded mandrel to be screwed into the nut portion and then to be unscrewed again.

It is an object of the present invention to provide an adaptor whereby a pneumatically operated pulling tool of the type defined can be easily and readily adapted to place threaded anchor socket fasteners of the type referred to above. Another object of the invention is to provide such an adaptor which, when secured to a tool, provides a combination of tool and adaptor which is simple and speedy in operation.

A further object of the invention is to provide such an adaptor which is simple and economical of manufacture and maintenance.

A specific embodiment of the invention will now be described by way of example, in the form of an adaptor and the combination thereof with a hydro-pneumatic pulling tool to form a gun for placing threaded anchor socket fasteners of the type referred to. The example will be described with reference to the accompanying drawings, in which:

FIG. 1 is a longitudinal cross-section through the gun comprising the adaptor and the tool secured together;
FIG. 2 is a similar section, to an enlarged scale, through the adaptor;
FIG. 3 is a transverse section through the adaptor on the line III—III of FIG. 2;
FIG. 4 is a section on the line IV—IV of FIG. 2;
FIGS. 5a, 5b, 5c; 6a, 6b, 6c; 7a, 7b, 7c; and 8a, 8b, 8c illustrate schematically the relationship of the actuating member of the tool and the various parts of the lever mechanism and trigger means of the adaptor at successive stages of the placing cycle of the gun; and
FIGS. 9a, 9b, 9c, 9d and 9e illustrate in longitudinal cross-section various stages in the placing of a threaded anchor fastener by means of the gun;
FIG. 10 illustrates a modification of the operative connection between the rotor of the rotation means and the mandrel; and
FIGS. 11 and 12 show schematically sections on the line XI—XI of FIG. 10.

The pneumatically operated pulling tool of this example has a head member 11 provided as an integral part of an upper casting 12. Formed within the head member is a working cylinder 13 with which reciprocates a hydraulic working piston 14 secured to a pull-rod 15 which provides the pulling member. The tool also includes a lower casting 16 secured to the lower end of the upper casting 12. The pneumatically actuated power system of the tool includes a pneumatic power connection 17, a pneumatic inlet valve 18, a pneumatic cylinder 19 formed within the lower casting 16, a pneumatic piston 21 working within the cylinder 19, and a piston rod 22 secured to the piston 21 and passing through a gland in a plug member 23 between the upper casting 12 and the lower casting 16 and entering a hydraulic master cylinder 24 formed within the upper casting 12. The pneumatic control valve 18 communicates via bore 25 and a pressure reduction valve 26 with the space 27 in the pneumatic cylinder 19 below the pneumatic piston 21 and on the side thereof opposite to the piston rod 22. The hydraulic master cylinder 24 communicates by means of a bore 28 with the space 29 in the hydraulic working cylinder 13 on the same side of the hydraulic piston 14 as the pullrod 15. The combination of the pneumatic cylinder 19, the pneumatic piston 21, the hydraulic piston rod 22, hydraulic master cylinder 24 and hydraulic working cylinder 13 and piston 14, act as a pneumatic hydraulic thrust intensifier. When a source of pneumatic power (i.e., compressed air) is connected to the connection 17 (for example by means of a compressed air line 31 and connector 32) and the pneumatic control valve 18 is opened to admit compressed air to the space 27, the piston 21 and piston rod 22 are driven upwardly, driving hydraulic fluid (which fills the cylinder 24, bore 28 and space 29) at a higher pressure into the space 29, thus forcing the piston 14 rearwardly within the cylinder 13 and retracting the pull-rod 15 into the head member 11 with considerable force.

The pneumatic control valve 18 is normally kept closed by means of a spring 33 which urges valve member 30 upwardly into contact with its seat. In this example the actuating member is provided in the form of a trigger 34 carried on the upper casting 12 adjacent the head member 11. The trigger 34 is pivoted on a pivot 35 and is connected to the valve 18 by means of a mechanically coupling comprising link 36, crank 37 and push-rod 38. The trigger member 34 is operated by depressing it towards the upper casting 12, thus opening the valve 18 and actuating the tool as previously described.

In the tool of this example, the bottom end 20 of the push-rod 38 is normally spaced away from the valve member 30, a spring 33a urging the push-rod upwardly away from the valve member. Consequently there is a small amount of controlled lost motion between the push-rod 38 and the valve member 30. In other words, when the trigger 34 is depressed from its normal position illustrated in FIG. 1 (in which it is maintained by the action of spring 33a through the linkage 38, 37 and 36), the valve 18 does not open until the trigger 34 has been moved through a certain predetermined distance.

When such a tool is used for placing fasteners such as blind rivets which require a mandrel to be pulled with respect to a body part, a jaw mechanism is secured to the free end of the pull-rod 15 by being screwed onto the threaded end portion 40 thereof. One end of a tube is screwed into the internally threaded wall 39 of cylindrical recess 41 in the head member 11 surrounding the pull-rod 15, the other end of the tube carrying an annular anvil through which the mandrel of the rivet is inserted to be gripped by the jaw mechanism. In order to fit the adaptor which is the subject of the present invention to this tool, the jaw mechanism is removed from the end of the pull-rod 15 and the tube is unscrewed from the body member. These parts are replaced by the adaptor which is secured to the tool, as illustrated in FIG. 1.

The adaptor comprises a body member 42, a mandrel 43 having a threaded portion 44 extending outside the front of the adaptor body, pneumatically powered rotation means in the form of a turbine 45, rotation control means for controlling the turbine in the form of two valves 46 and 47 and a lever mechanism 48, and a single trigger means 49.

The upper part 51 of the adaptor body has running therethrough a generally cylindrical bore 52. Within this bore are contained two bearing blocks, a forward bearing block 53 and a rear bearing block 54, in which the dandrel 43 can rotate freely and can also reciprocate to a certain extent. Screwed into the front end of the bore 52 is a nose piece 55, and screwed into the front end of the nose piece 55 is an interchangeable anvil 56 providing an annular anvil face 57 on its outer end through which the threaded part 44 of the mandrel projects. The threaded part 44 of the mandrel is separate from the main part 43 of the mandrel and is coupled to it by means of a threaded coupling sleeve 58 inside the nose piece 55. Thus both the anvil and the threaded part of the mandrel are interchangeable to suit different threaded anchor socket fasteners of different sizes. The rear end of the mandrel 43 is attached to a coupling member 59 which rotates and reciprocates within a rearward extension 61 of the upper part 51 of the adaptor body. The forward end of the coupling member 59 is coupled to the rear end of the mandrel 43 by means of a tension-supporting rotary bearing comprising a part-circular circumferential groove 63 near the rear end of the mandrel but spaced away therefrom by a part 64 of full diameter, and a flange 65 on the coupling member enclosing a part-circular recess 66 in the coupling member into which the part 64 at the rear end of the mandrel fits. The recess 66 and flange 65 extend around 270° and are thus of U configuration to enable manufacture and assembly of the parts. More specifically, the flange 65 extends for 270° around the circumferential groove 63 on the mandrel and fits snugly into it in an axial direction, so that the mandrel 43 is free to rotate with respect to the coupling member 59 but is constrained to move axially with the coupling member 59. The rear end of the coupling member 59 has an axial bore 67 which is threaded internally at 68, to match and mate with the externally threaded end portion 40 of the pull rod 15 of the hand tool. The rear part of the rear extension 61 of the adaptor body is threaded externally at 69 to match and mate with the internally threaded wall 39 of the recess 41 in the head member of the hand tool. The extension member 61 is rotatable with respect to the adaptor body 51 to enable it to be screwed into and unscrewed from the tool head. It is held in the adaptor body by means of an outwardly extending radial flange 71 at its forward end received within a corresponding annular recess 72 near the rear of the adaptor body.

The turbine 45 which rotates the mandrel comprises a rotor 73 secured to the mandrel 43 and rotatable within a turbine chamber 74 which is part of the bore 52 intermediate the ends thereof and defined at one end by the bearing block 53 and at the other end by the bearing block 54. The rotor 73 is formed from a solid piece of metal from which six longitudinal grooves 75 extending along the greater part of the length of the rotor, are milled out to leave upstanding lands or vanes 76. The rotor 73 is shorter than the distance along the turbine chamber between the bearing blocks 53 and 54, in order to allow the rotor to reciprocate with the mandrel when the adaptor is in use. The turbine chamber 74 has two inlet ports for clockwise and counterclockwise rotation respectively of the mandrel. The first conduit 78 within the adaptor body meets the turbine chamber 74 tangentially through the port 79 to admit air to the turbine for clockwise rotation of the rotor. Likewise a second conduit 81 within the adaptor body meets the turbine chamber tangentially at port 82 to supply air for counterclockwise rotation of the rotor. The conduit 78 is connected to the value 47, and the conduit 81 is connected to the valve 46. The turbine chamber is also provided with an exhaust port 83 to allow air to escape from the turbine chamber.

The adaptor also has a pneumatic connection 84, connectable to a source of pneumatic power, in the form of an internally threaded inlet 85. In this example of the invention, the pneumatic connection 84 is connected to a source of pneumatic power via the hand tool. As illustrated in FIG. 1, there is screwed into the inlet 85 a suitable threaded coupling 86 which is secured to the upper end of a pipe 87 which runs down the body of the tool outside the casting. The lower end 88 of the pipe 87 is connected to the inlet side of the pneumatic valve 18 so that when compressed air is supplied to the valve 18 through the line 31 and connector 32, compressed air is automatically also supplied to the pneumatic coupling 85 on the adaptor. The pneumatic connection 85 communicates with a bore 89 in the interior of the upper part 51 of the adaptor body, parallel to and below the cylindrical bore 52. This bore 89 in turn communicates with the inlet side of each of the valves 47 and 46. The two valves 47 and 46 are identical in construction and operation. Essentially each comprises a valve stem 91 with a head 92 at its upper end. The underside of the head contacts a valve seat 93 and covers a port 94, through which the stem 91 extends. The valve stem and head are urged downwardly, into the closed position in which the head contacts the seat, by means of a helical spring 95 acting between the underside of the seat and a circlip 96 resting against an annular shoulder on the valve stem. Underneath the seat of each valve is a valve chamber 97, and the bottom of the valve stem projects through a seal in the bottom of the valve chamber into operative contact with the lever mechanism 48. The upper side of each valve seat and its associated head is open to the bore 89. As illustrated in FIG. 4, the valve heads 92 are substantially square in shape whilst the recess 98 in which each is located in circular in shape. This leaves four spaces around each valve head to allow the ready passage of compressed air from the bore 89 through the port 94 in a valve seat when the associated valve head is raised. Outlet from each valve is from the side of the valve chamber of valve 46 communicates by means of an angled bore 99 with the bottom of conduit 81, and the chamber of valve 47 communicates by means of an angled bore 101 with the bottom of conduit 78. Thus the valve 47 controls clockwise rotation of the mandrel, and the valve 46 controls anticlockwise rotation of the mandrel. The two valves 46 and 47 are located below the mandrel 43, one behind the other. The "clockwise" valve 47 is towards the rear of the adaptor (i.e., nearer the tool) and the anticlockwise valve 46 is towards the front of the adaptor (i.e., nearer the nose of the adaptor.)

The construction of the lever mechanism 48 and single trigger means 49 will be now described, with particular reference to FIGS. 2, 5a, 5b and 5c of the accompanying drawings. All these figures show the lever mechanism and trigger means in the position in which neither the tool not the adaptor is actuated. FIG. 5a is a somewhat simplified view similar to that of FIG. 2 and showing the valves in outline only. FIG. 5b is an underplan view on the line Vb—Vb on the FIG. 5a, and FIG. 5c is a section on the line Vc—Vc of the FIG. 5b.

The lever mechanism 48 comprises two levers 102 and 103 associated respectively with the two valves 47 and 46. Both levers lie underneath the valves 47 and 46 and each is pivoted about an axis running transversely at right angles to the axis of the mandrel 43. The shorter level 102 is pivoted near its forward end on a rod 104 journaled at each end in the body of the adaptor and positioned approximately mid-way between the two valves 47 and 46. The bottom of the stem of the "clockwise" valve 47 rests on the upper surface of the lever 102 at a position 105. The longer lever 103 is pivoted near its forward end on a rod 106 which is positioned forwardly of the valve 46. The bottom end of the stem of the "anticlockwise" valve 46 contacts the upper surface of the lever 103 at position 107. As illustrated in FIG. 5b, each lever 102 and 103 at its forward end extends for nearly the whole width of the cavity 108 in the lower part of the adaptor body within which the levers are accommodated. At its rearward end each lever occupies only less than half of the width of the rearward extension 110 of the cavity 108, the two rearmost parts of the levers 102 and 103 lying alongside each other. The longer lever 103 passes above the pivot rod 104 of the shorter lever 102, the shorter lever 102 having a cut-away part to accommodate the longer lever 103 beside it. Similarly the longer lever 103 is shaped to accommodate the stem of valve 47 which is in contact with the upper surface of the shorter lever 102.

In order to facilitate the description of the shape of the rearward ends of the levers 102, 103, which are engaged by the single trigger means of the adaptor, the construction of that single trigger means will be described first.

The single trigger means 49 comprises a trigger block 109 reciprocable backwards and forwards in slideways at the bottom of the adaptor body. As illustrated in FIG. 3, these slideways comprise a groove 111 near the bottom of the inside of one wall of the cavity 108 and an opposed groove 112 inside the other wall. Two flanges 123, 124 are received within these grooves and provide for the sliding movement of the trigger block. Projecting from the bottom of the trigger block is a trigger 124. Forward movement of the trigger block is limited by means of a stop 125 at the forward end of the slideway, and the trigger block is urged forwardly towards the stop by means of a helical spring 126 supported at its rearward end on a rod 127 secured to the tool body 12 and projecting forwardly therefrom parallel to the slideways on the adaptor. The forward end of the spring 126 is received within a bore 128 within the trigger block (the spring 126, and rod 127 are shown in FIG. 1 only, and the stop 125 in FIGS. 1 and 2 only). When the trigger block 49 is moved rearwardly (i.e., towards the tool body 12) by a sufficient extent, the rearmost face 129 of the trigger block contacts the tool figure 34 and moves it rearwardly, thereby actuating the hydro-pneumatic pulling mechanism of the tool as previously described. The trigger block 109 carries the actuating member for actuating the two valve levers 102, 103. This actuating member is referred to as a butterfly since, in use, of the adaptor, it performs repeated reciprocating pivoting movements, or flapping movements.

The butterfly 131 comprises a horizontally extending main body portion 132, formed integrally with a vertically downwardly projecting pivot rod 133 at its forward end and a vertically upwardly projecting tab 134 at its rearward end. The butterfly is accommodated in a suitably sector-shaped cavity 135 in the uppermost surface of the trigger block 109, the pivot rod 133 being received in a bore 136 projecting downwardly from the forward end of the cavity 135. The uppermost part of the tab 134 projects above the upper face of the trigger block 109 into engagement with the levers 102 and 103. The tab 134 has a flat upper surface 137 and has rounded semicircular front and rear ends 138 and 139 respectively. The bore 136 which journals the pivot rod 133 is offset from the centre line of the adaptor, towards the left when looking rearwardly at the adaptor, as illustrated in FIG. 3. As illustrated in FIGS. 2, 5a, 5b and 5c, the normal position of the butterfly 131 is parallel to the sliding axis of the trigger block 109. In this position the tab 134 is accommodated within a cut-out portion 141 in the underside of the longer lever 103.

Each of the levers 102, 103, has on its underside towards its rearward end a camming face which (in operation of the mechanism) is engaged by the top of the tab 137, and also a guiding face which guides the tab into engagement with the camming face of the other lever. The camming face 142 of the shorter lever 102 forms the underneath face of the rearmost part of the lever and, as illustrated in FIG. 2, is inclined in a direction along the axis of movement of the trigger block 109 so that the rear end of the face 142 is lower than the forward end of the face. Furthermore, as indicated in FIG. 5c, the face 142 is slightly inclined in a direction transverse of the said direction of movement, so that its outer edge is slightly higher than its inner edge.

The camming face 143 of the longer lever 103 likewise forms the underneath face of the rearmost part of that lever. This face is also inclined in a direction parallel to the direction of movement of the trigger block, but in the opposite direction of the face 142 of the lever 102. Thus the face 143 is higher at its rearmost end and lower at its forward end. Similarly, the face 143 is also inclined slightly in a direction transversely to the said axis of movement, so that its outer edge is slightly higher than its inner edge.

The guiding face 144 of the shorter lever 102 is at the rearward end of that lever and on the side of that lever facing towards the adjacent lever 103. The face 144 is oblique with respect to the axes of movement of the trigger block, so that its forward edge is near the lever 103 and its rearward edge is away from the lever 103.

The guiding face 145 of the longer lever 103 is (when the levers are in a position illustrated in FIGS. 2, and 5a, 5b) parallel to the guiding face 144 of the lever 102. As illustrated in FIG. 5b, the face 145 is oblique with respect to the axis of movement of the trigger block 109, and has its rearward edge towards the other lever 102 and its forward edge away from the lever 102. As illustrated in FIG. 5b, in the normal position of the butterfly, the rearward rounded face 139 of the tab is adjacent the forward part of the guiding face 145.

The way in which the valve actuating levers 102 and 103 are operated by the butterfly tab 134 when the trigger 124 is pulled and released will now be described. As just mentioned, the normal or inoperative position of the butterfly and levers is as in FIGS. 5a, 5b and 5c. In this position, the butterfly tab 134 is not in contact with either of the levers 102, 103. Both of the levers are pressed downwardly by the spring-loaded valve stems and both valves 47 and 46 remain closed. When the trigger 124 is pulled towards the tool body, the trigger block 109 is moved rearwardly (i.e., towards the right as viewed in FIGS.

2, 5a, 6a, 7a and 8a), and the rear rounded face 139 of the butterfly tab 134 contacts the guiding face 145 of the lever 103. As the face 145 is oblique with respect to the rearward direction of movement of the butterfly, this guiding face causes the butterfly to pivot about its pivot rod 133 so that the butterfly tab moves transversely of the direction of movement of the trigger block and enters under the worward, higher, end of the camming face 142 of the other lever 102. As the trigger block continues to move rearwardly, the rear end of the top face 137 of the butterfly tab contacts the camming face 142 and raises the lever 102, the buterfly tab being urged across to the remote side of the face 142 due to the slight transverse inclination of that face. The raising of the lever 102 lifts the stem of the "clockwise" valve 47 and opens the valve. This position of the trigger means and valve lever mechanism is illustrated in FIGS. 6a, 6b and 6c.

It will be noted from FIG. 6a that during the movement of the trigger block rearwardly to this position, the rear face 129 of the trigger block 109 has already contacted the trigger 34 of the pulling tool and has moved it from its original position. However the trigger 34 has not yet reached the position in which it actuates the valve 18 of the pulling tool.

Continued pulling on the trigger 124 of the adaptor causes further rearward movement of the trigger block 109. The butterfly tab 134 moves beyond the rearmost end of the lever 102, so that the lever 102 drops off the butterfly tab and returns to its lower position under the influence of the spring-loaded stem of the valve 47. The valve 47 thus closes. During this movement, the rear face 129 of the trigger block moves the pulling tool trigger 34 even further. Just after the valve 47 has closed, the trigger 34 reaches the position where it opens the valve 18 on the pulling tool to actuate the hydropneumatic pulling mechanism of the tool in the way previously described. This position is illustrated in FIGS. 7a, 7b and 7c.

Release of the rearward pressure on the trigger 124 of the adaptor allows it to return forwardly under the urging of the spring 126. When this movement occurs, the butterfly tab 134 first comes into contact with the guiding face 144 of the lever 102, which is now opposite the butterfly tab since the lever 102 has returned to its lowered position. Since the face 144 is oblique to the direction of return movement of the trigger block, the butterfly tab is guided by the face 144, as the trigger block moves forwards, transversely of the movement of the trigger block and underneath the rearward part of the camming face 143 of the lever 103. The forward end of the top face 137 of the butterfly tab contacts the face 143 and, as the forward movement of the trigger block continues, lifts the lever 103 about its pivot 106, thus opening the "anticlockwise" valve 46. The slight transverse inclination of the face 143 insures that the butterfly tab moves across the face 143 towards the edge thereof away from the other lever 102. This position of the butterfly, levers and valves is illustrated in FIGS. 8a, 8b and 8c.

When the trigger block 109 moves towards its initial position, the butterfly tab 134 moves past the forward, lower, end of the face 143. When this happens, the lever 103 returns to its lower position and the "anticlockwise" valve 46 is closed. The position of the butterfly, levers and valves is then as before, as shown in FIGS. 5a, 5b and 5c.

Thus it will be seen that movement of the trigger 124 falling backwards from its rest position and then forwards again has actuated automatically and in sequence, firstly the "clockwise" valve 47, secondly the valve 18 of the pulling gun, and thirdly the "anticlockwise" valve 46.

The use of the gun comprising the combination of the tool and adaptor in order to place a threaded anchor fastener will now be described, more particularly with reference to the FIGS. 9a, 9b, 9c, 9d and 9e.

The gun may be used with various types of threaded anchor fastener, one type of which is shown by way of example in FIGS. 9a–9e. This anchor fastener 146 is an integral metal structure and comprises an internally threaded nut portion 147 which has a conical tapering exterior surface 148, and a tubular body portion 149 coaxial with the nut portion and joined thereto at the narrow end of the tapered body. The anchor fastener is to be placed in a circular aperture 151 in a sheet of metal 152. The circular aperture 151 is very slightly larger in diameter than the external diameter of the body portion 149 of the fastener. The body portion 149 of the fastener has at its free end (i.e., the end remote from the nut portion 147) an outwardly projecting lip of burr 154 which is too large to pass through the aperture 151 in which the fastener is to be installed. The gun is equipped with a threaded mandrel 44 which mates with the threaded portion of the fastener, and an anvil 56 which has an annular face 57 of the same diameter as the free end 153 of the body portion of the fastener.

Figure 9B:
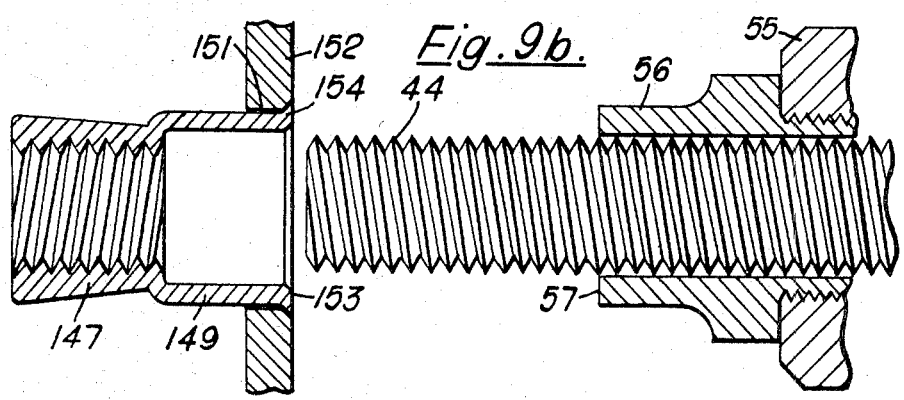

The fastener is inserted into the aperture 151 so that the burr 154 engages with the walls of the aperture 151, as illustrated in FIG. 9b. The operator then pulls the trigger 124 of the gun to its first position (illustrated in FIGS. 6a, 6b and 6c) so that the "clockwise" valve is opened and the mandrel is rotated at high speed in a clockwise direction. The end of the threaded mandrel is then offered up, through the interior of the body portion of the fastener, into the threaded portion of the nut. The rotating threaded mandrel engages with the threads inside the nut so that the mandrel is rapidly screwed into the nut. This will continue until the end 57 of the anvil 56 of the gun contacts the outer end 153 of the fastener.

Figure 9C:
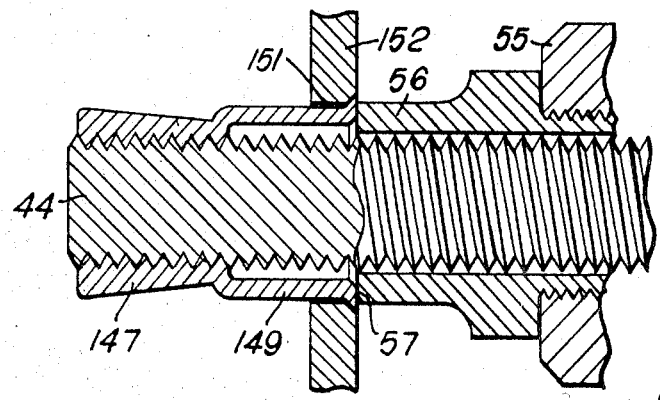

The rotor comes to a halt, the compressed air merely passing between the rotor and the wall of the turbine chamber and out of the exhaust port. This position of the anvil and anchor fastener is illustrated in FIG. 9c.

Figure 9D:
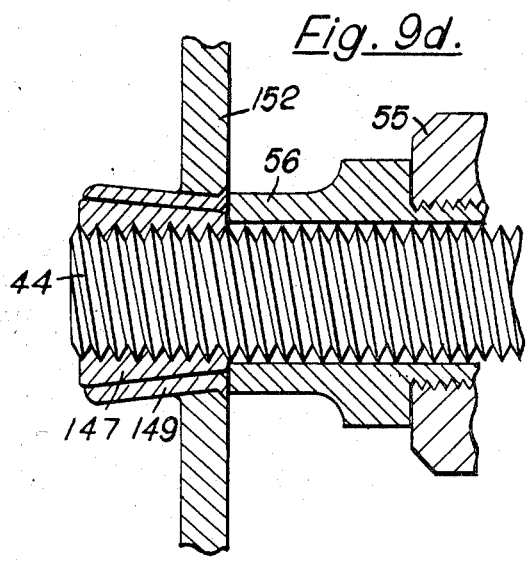
Figure 9E:
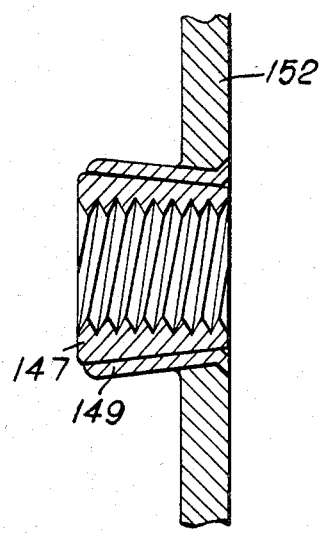

The operator then pulls the trigger 124 to its full extent, closing the "clockwise" valve 47 and actuating the valve 18 of the pulling gun. The mandrel is thus pulled into the anvil with a considerable force. This causes the anchor fastener to shear at the junction between the nut portion and the body portion, and the tapered nut portion is pulled into the body portion expanding the body portion to engage the walls of the aperture 151. This position is illustrated in FIG. 9d.

The operator then releases the trigger 124. The hydropneumatic pulling system first returns to its original position, thus pulling the anvil 56 back to its original position with respect to the threaded mandrel 44. Continued release of the trigger 124 then opens the "anticlockwise" valve 46 and the threaded mandrel 44 is rotated rapidly in anticlockwise direction, thus unscrewing the mandrel from the installed anchor fastener, which is shown in FIG. 9c. When the trigger 124 is released completely, the gun returns to its original condition, ready for the installation of a further fastener.

In the foregoing example the mandrel 43 is secured directly to the rotor 73 for rotation thereby. FIGS. 10, 11 and 12 illustrate a modification in which the rotor 73a is rotationally connected to the mandrel 43a by means of mechanical coupling 151. FIG. 10 is a partially sectional elevation of the modified rotor and mandrel. The coupling 151 comprises a circular disc 152 secured to the mandrel in front of the rotor and having a rearwardly projecting stop pin 153 spaced radially away from its centre. The front end of the rotor carries an arcuate pawl 154 which is pivotally attached to the rotor by a pivot pin 155 near one end. About one third of the way along its length the pawl carries a forwardly projecting pin 156. When the rotor rotates at sufficient speed in either direction the pawl is flung outwards by centrifugal force against an annular rim 157 projecting forwardly from the rotor and partially shrouding the pawl. The arrangement is such that when the pawl 154 is fully outward against the rim 157, the pawl pin 156 engages the stop pin 153 on the disc. FIG. 11 shows the position when the rotor is rotating clockwise (screwing in), and FIG. 12 shows the position when the rotor is rotating anticlockwise (unscrewing), the directions of rotation being indicated by the arrows in FIGS. 11 and 12.

When the rotor is rotating clockwise, the pawl 154 is in a "leading" position, as illustrated in FIG. 11. If resistance is offered to rotation of the mandrel, the pawl pin 156 is urged into tighter contact with the stop pin 153. The pawl pin 156 cannot slip out of engagement with the stop pin 153, since movement of the pawl radially outwardly about its pivot 155 is prevented by the rim 157, and movement of the pawl pin 153 past the radially inner side of the stop pin 156 would first require rotation of the rotor anticlockwise with respect to the mandrel, which is prevented by the urging of the rotor. Consequently during clockwise rotation against mandrel resistance the pawl pin 156 cannot disengage the stop pin 153 and positive clockwise driving of the mandrel by the rotor occurs.

When the rotor is rotating anticlockwise the pawl 154 is in a "trailing" position, as illustrated in FIG. 12. If sufficient resistance is offered to the mandrel, the pawl 154 can move radially inwardly about its pivot pin 155 against the urging of the centrifugal force on it. This allows the pawl pin 156 to disengage from the stop pin 153 and pass radially inwardly of the latter. The rotor is then free to rotate momentarily. The pawl moves outwards under centrifugal force, and when the rotor has made nearly a complete revolution with respect to the mandrel the pawl pin 156 hits the stop pin 153. Thus an anticlockwise rotational impact is applied to the mandrel by the rotational energy of the rotor and pawl. This impact is repeated rapidly so long as resistance is offered to rotation of the mandrel.

This modification to the tool described in the foregoing example can be useful when placing threaded anchor fasteners which may present resistance to unscrewing of the threaded end of the mandrel. This may occur if, for example, the outside diameter of the fastener is larger, in relation to the diameter of the hole in which it is placed, than the optimum. The nut portion of the fastener may be squeezed so that its threads distort and interfere with the mandrel. The repeated impacting applied to the mandrel in the anticlockwise direction assists in unscrewing the mandrel from the placed fastener. Of course, in normal use no such resistance will be offered to the anticlockwise rotation of the mandrel, and the impacting will not occur, as the pawl pin and stop pin remain engaged.

The invention is not restricted to the details of the foregoing example, but may be put in practice in other ways lying within the scope of the appended claims which define the invention. For instance, the external pipe 87 may be replaced by a suitable bore formed within the body casting of the tool.

We claim:

1. An adaptor for a pneumatically operated pulling tool of the type defined, which adaptor comprises: a body member securable to the head member of the tool; a threaded mandrel carried by the body member for rotary and longitudinal reciprocating movement with respect thereto; the mandrel being securable to the pulling member of the tool both to move longitudinally therewith when the pulling member is retracted relative to the head member and also to rotate freely with respect to the pulling member; pneumatically powered rotation means operatively connected to the mandrel for rotating the same; rotation-control means for controlling the pneumatically powered rotation means and operable selectively to produce either rotation of the mandrel in one sense, or rotation of the mandrel in the opposite sense; and a single trigger means operatively connected to the said rotational-control means and also operatively connectable to the actuating member of the hand tool, such that operation of the said single trigger means of the adaptor first operates the rotation-control means to produce rotation of the threaded mandrel in the said one sense, and thereafter operates the actuating member of the tool to retract the pulling member relative to the head member thereby causing the mandrel of the adaptor to move longitudinally, and thereafter operates the rotation-control means to produce rotation of the mandrel in the said opposite sense.

2. An adaptor for a pneumatically operated pulling tool of the type defined, which adaptor is securable to the tool in a predetermined position relative thereto and which comprises: a body member securable to the head member of the tool; a threaded mandrel carried by the body member for rotary and longitudinal reciprocating movement with respect thereto; the mandrel being securable to the pulling member of the tool, when the body member of the adaptor is secured to the head member of the tool as aforesaid, for movement both longitudinally therewith when the pulling member is retracted relative to the head member and also rotationally and freely with respect to the pulling member; pneumatically powered rotation means operatively connected to the mandrel for rotating the same; a pneumatic connection connectable to a source of pneumatic power to supply the same to the pneumatically powered rotation means; rotation-control means for controlling the pneumatically powered rotation means and operable selectively to produce either rotation of the mandrel in one sense, or rotation of the mandrel in the opposite sense; and a single trigger means operatively connected to the said rotation-control means and also operatively connectable to the actuating member of the hand tool, when the adaptor is secured to the tool as aforesaid, such that, when the adaptor is connected to the tool as aforesaid with the body member secured to the head member of the tool and the mandrel secured to the pulling member as aforesaid and when the pneumatic connection is connected to a source of pneumatic power as aforesaid, operation of the said single trigger means of the adaptor first operates the rotation-control means to produce rotation of the threaded mandrel in the said one sense, and thereafter operates the actuating member of the tool to retract the pulling member relative to the head member thereby causing the mandrel of the adaptor to move longitudinally, and thereafter operates the rotational-control means to produce rotation of the mandrel in the said opposite sense.

3. An adaptor as claimed in claim 2, in which the said single trigger means is arranged to reciprocate with respect to the adaptor body member, movement of the trigger member in one direction being, when the adaptor is secured to the tool as aforesaid, movement towards the actuating member of the tool; and which adaptor also includes trigger biassing means biassing the said trigger means in a reverse direction opposite to the one direction and away from the actuating member of the tool; and in which the aforesaid operation of the said trigger means comprises first moving the trigger means in the said one direction against the biassing means until it reaches and operating the actuating member, and then releasing the trigger means to return in the said reverse direction under the urging of the biassing means.

4. An adaptor as claimed in claim 2, in which the said reciprocating movement of the single trigger means is movement past the rotation-control means in operative connection therewith; movement of the trigger means past the rotation-conrtol means in the said one direction operating the rotation-control means to produce rotation of the adaptor mandrel in the said one sense, and movement of the trigger means past the rotation-control means in the said reverse direction operating the rotation-control means to produce rotation of the mandrel in the said opposite sense.

5. An adaptor as claimed in claim 4, in which the rotation-control means includes first and second operating levers occupying different positions in a direction transverse to the direction of reciprocation of the trigger means; the trigger means includes an abutment member carried therewith in the aforesaid reciprocating movement thereof, the said abutment member being movable with respect to the trigger means in a direction transversely of the said direction of reciprocating movement to operatively engage either the first operating lever or the second operating lever; and in which there is also provided first guiding means for guiding the abutment member into operative engagement with the first operating lever when the trigger means approaches and moves past the rotation-control means in the aforesaid one direction, and second guiding means for guiding the abutment member into operative engagement with the second operating lever when the trigger means approaches and moves past the rotation-control means in the aforesaid reverse direction.

6. An adaptor as claimed in claim 5, in which the first guiding means comprises a guiding surface on the second operating lever and the said second guiding means comprises a guiding surface on the said first operating lever.

7. An adaptor as claimed in claim 2, in which the said pneumatic connection is positioned to be connected, when the adaptor is secured to the tool in a predetermined position relative thereto as aforesaid, to a mating pneumatic connection carried by the tool.

8. The combination with a pneumatically operated pulling tool of the type defined, of an adaptor which comprises: a body member secured to the head member of the tool; a threaded mandrel carried by the body member for rotary and longitudinal reciprocating movement with respect thereto; the mandrel being secured to the pulling member of the tool both to move longitudinally therewith when the pulling member is retracted relative to the head member and also to rotate freely with respect to the pulling member; pneumatically powered rotation means operatively connected to the mandrel for rotating the same; rotation-control means for controlling the pneumatically powered rotation means and operable selectively to produce either rotation of the mandrel in one sense, or rotation of the mandrel in the opposite sense; and a single trigger means operatively connected to the said rotational-control means and also operatively connectable, when the trigger means is operated, to the actuating member of the hand tool, such that operation of the said single trigger means of the adaptor first operates the rotation-control means to produce rotation of the threaded mandrel in the said one sense, and thereafter operates the actuating member of the tool to retract the pulling member relative to the head member thereby causing the mandrel of the adaptor to move longitudinally, and thereafter operates the rotation-control means to produce rotation of the mandrel in the said opposite sense.

9. The combination as claimed in claim 8, in which the said single trigger means is arranged to reciprocate with respect to the adaptor body member, movement of the trigger member in one direction being movement towards the actuating member of the tool and in which the adaptor also includes trigger biassing means biassing the said trigger means in a reverse direction opposite to the one direction and away from the actuating member of the tool; and in which the aforesaid operation of the said trigger means comprises first moving the trigger means in the said one direction against the biassing means until it reaches and operates the actuating member, and then releasing the trigger means to return in the said reverse direction under the urging of the biassing means.

10. The combination as claimed in claim 8, in which the pneumatically operated pulling tool includes a first pneumatic connection which in use of the tool is connected to a source of pneumatic power for operation of the gun; and in which the adaptor includes a second pneumatic connection which is connected to the said first pneumatic connection thereby to supply pneumatic power to the pneumatically powered rotation means.

References Cited

UNITED STATES PATENTS

| 3,388,621 | 6/1968 | Neuschotz | 29—240X |
| 3,390,597 | 7/1968 | James | 81—53 |
| 3,400,442 | 9/1968 | Morris | 29—208 |

THOMAS H. EAGER, Primary Examiner

U.S. Cl. X.R.

29—240, 252